United States Patent
Shimasaki et al.

(10) Patent No.: US 12,090,834 B2
(45) Date of Patent: Sep. 17, 2024

(54) VEHICLE

(71) Applicants: TOYOTA JIDOSHA KABUSHIKI KAISHA, Toyota (JP); SUBARU CORPORATION, Tokyo (JP)

(72) Inventors: Osamu Shimasaki, Nisshin (JP); Satoshi Ikeda, Tokyo (JP); Shinji Nakano, Tokyo (JP); Naoki Tsukahara, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 406 days.

(21) Appl. No.: 17/703,141

(22) Filed: Mar. 24, 2022

(65) Prior Publication Data

US 2022/0314786 A1 Oct. 6, 2022

(30) Foreign Application Priority Data

Apr. 1, 2021 (JP) ................. 2021-062903

(51) Int. Cl.
*B60K 11/04* (2006.01)
*B60R 16/023* (2006.01)
*B60R 16/033* (2006.01)

(52) U.S. Cl.
CPC .......... *B60K 11/04* (2013.01); *B60R 16/0239* (2013.01); *B60R 16/033* (2013.01)

(58) Field of Classification Search
CPC .... B60K 11/04; B60R 16/0239; B60R 16/033
See application file for complete search history.

(56) References Cited

U.S. PATENT DOCUMENTS

| | | | | |
|---|---|---|---|---|
| 4,403,648 A | * | 9/1983 | Styok .................. | B60K 11/04 165/149 |
| 5,088,572 A | * | 2/1992 | Schroeder ............. | B60K 11/04 180/300 |
| 5,271,473 A | * | 12/1993 | Ikeda ................... | B60K 11/04 296/203.02 |
| 5,544,714 A | * | 8/1996 | May ..................... | B60K 11/04 292/251 |

(Continued)

FOREIGN PATENT DOCUMENTS

| | | | | |
|---|---|---|---|---|
| CN | | 109017273 A | * 12/2018 | |
| DE | 102004018052 A1 | * 11/2005 | ............. | B60R 19/12 |

(Continued)

*Primary Examiner* — Jacob B Meyer
(74) *Attorney, Agent, or Firm* — Sughrue Mion, PLLC

(57) ABSTRACT

A vehicle includes a vehicle body, a radiator located on a forward side in the vehicle body, a side support that supports a side portion of the radiator in a vehicle-body width direction and that extends along a vehicle-body up-down direction, a side member that is linked to the side support and that extends along a vehicle-body front-rear direction, at least one electrical component disposed rearward of the radiator in the vehicle-body front-rear direction, and a reinforcing member that is joined to and extends between the side support and the side member in a space defined by a rearward side of the side support in the vehicle-body front-rear direction and an upward side of the side member in the vehicle-body up-down direction.

9 Claims, 3 Drawing Sheets

(56) References Cited

U.S. PATENT DOCUMENTS

| | | | | |
|---|---|---|---|---|
| 5,597,047 | A * | 1/1997 | Thompson | F28F 9/002 |
| | | | | 180/68.6 |
| 5,785,140 | A * | 7/1998 | Suzuki | B60K 11/04 |
| | | | | 267/136 |
| 5,868,196 | A * | 2/1999 | Tanaka | F28F 9/002 |
| | | | | 228/183 |
| 6,412,581 | B2 * | 7/2002 | Enomoto | B60K 11/04 |
| | | | | 165/69 |
| 6,672,416 | B1 * | 1/2004 | Guyomard | B60K 11/04 |
| | | | | 180/68.6 |
| 7,108,092 | B2 * | 9/2006 | Suwa | B60R 19/52 |
| | | | | 248/232 |
| 7,942,223 | B2 * | 5/2011 | Obayashi | B60K 11/04 |
| | | | | 180/68.1 |
| 8,051,933 | B2 * | 11/2011 | Hwang | B60K 11/04 |
| | | | | 180/68.6 |
| 8,408,344 | B2 * | 4/2013 | Williams | B60K 11/04 |
| | | | | 180/68.6 |
| 9,146,061 | B2 * | 9/2015 | Farlow | F28F 9/002 |
| 9,186,980 | B2 * | 11/2015 | Shibutani | B60K 11/04 |
| 9,321,345 | B2 * | 4/2016 | Lueschen | B60K 11/04 |
| 9,751,394 | B1 * | 9/2017 | Speichinger | E02F 9/0866 |
| 10,766,353 | B2 * | 9/2020 | Fukuoka | B62D 21/155 |
| 11,285,999 | B2 * | 3/2022 | Jaynes | B60D 1/565 |
| 11,338,666 | B2 * | 5/2022 | Gutierrez | F28D 1/05316 |
| 11,511,619 | B2 * | 11/2022 | Yong | B60H 1/00521 |
| 11,613,311 | B2 * | 3/2023 | Kwak | B62D 25/084 |
| | | | | 296/193.09 |
| 2010/0078149 | A1 * | 4/2010 | Yoshimitsu | B62D 25/084 |
| | | | | 296/193.09 |
| 2010/0314426 | A1 * | 12/2010 | Yokoi | B60R 19/34 |
| | | | | 224/555 |
| 2014/0203543 | A1 * | 7/2014 | Onishi | B60G 7/02 |
| | | | | 280/784 |
| 2018/0237073 | A1 | 8/2018 | Kiyoshita et al. | |
| 2019/0111774 | A1 * | 4/2019 | Fukuoka | B62D 21/11 |
| 2020/0086926 | A1 | 3/2020 | Hashida et al. | |
| 2022/0314786 | A1 * | 10/2022 | Shimasaki | B60R 16/033 |
| 2023/0406091 | A1 * | 12/2023 | Igashira | B62D 25/084 |

FOREIGN PATENT DOCUMENTS

| | | | | |
|---|---|---|---|---|
| DE | 102016118315 A1 * | 3/2018 | | B60K 11/04 |
| FR | 2901230 A1 * | 11/2007 | | B60K 11/04 |
| JP | 2605818 B2 * | 4/1997 | | |
| JP | 2000-344137 A | 12/2000 | | |
| JP | 2002160663 A * | 6/2002 | | |
| JP | 2005082020 A * | 3/2005 | | |
| JP | 2010515621 A * | 5/2010 | | |
| JP | 2010149601 A * | 7/2010 | | |
| JP | 5012906 B2 * | 8/2012 | | B62D 21/155 |
| JP | 2018-134952 A | 8/2018 | | |
| JP | 2019-147424 A | 9/2019 | | |
| JP | 2020-044911 A | 3/2020 | | |
| KR | 100508188 B1 * | 8/2005 | | |
| WO | 2008/093244 A2 | 8/2008 | | |
| WO | WO-2016084814 A2 * | 6/2016 | | B60K 11/04 |
| WO | WO-2023175843 A1 * | 9/2023 | | |

* cited by examiner

VEHICLE

CROSS-REFERENCE TO RELATED APPLICATION

This application claims priority to Japanese Patent Application No. 2021-062903 filed on Apr. 1, 2021, incorporated herein by reference in its entirety.

BACKGROUND

1. Technical Field

The technology disclosed in the present specification relates to a vehicle.

2. Description of Related Art

Japanese Unexamined Patent Application Publication No. 2020-44911 (JP 2020-44911 A) discloses a vehicle frontal portion structure of an electrified vehicle. In this vehicle frontal portion structure, a cross member for linking front end portions of front side members, which are disposed to extend in a vehicle-body front-rear direction in a forward side in the vehicle body, to each other in a vehicle-body width direction, is provided, and a radiator is provided rearward of the cross member. Thus, bending deformation of the front side members at a forward side of the vehicle body is suppressed.

SUMMARY

An electrical unit including a motor of the electrified vehicle is disposed rearward of the radiator and inward of the front side members in the vehicle-body width direction. Depending on the kind of collision of the vehicle, side supports that support right and left side portions of the radiator may exhibit rearward bending deformation. Depending on the location at which the electrical unit is installed, the electrical unit may also be damaged. A relay box, for example, is a kind of electrical unit that is particularly easily damaged even in a minor collision, and the effects of the damage are often widespread throughout the electrical equipment of the vehicle. Accordingly, disposing the electrical component efficiently while suppressing or avoiding damage to the electrical component due to collisions is necessary.

The technology disclosed in the present specification suppresses rearward bending deformation of a side support supporting a radiator in a vehicle-body front-rear direction, and provides an improvement in the degree of freedom in disposing an electrical component rearward of the radiator.

The present specification discloses a vehicle. A vehicle according to an aspect of the disclosure includes a vehicle body, a radiator located on a forward side in the vehicle body, a side support that supports a side portion of the radiator in a vehicle-body width direction and that extends along a vehicle-body up-down direction, a side member that is linked to the side support and that extends along a vehicle-body front-rear direction, and at least one electrical component disposed rearward of the radiator in the vehicle-body front-rear direction. The vehicle further includes a reinforcing member that is joined to and extends between the side support and the side member in a space defined by a rearward side of the side support in the vehicle-body front-rear direction and an upward side of the side member in the vehicle-body up-down direction.

In the vehicle according to the above aspect, the rearward side of the side support in the vehicle-body front-rear direction is reinforced by the reinforcing member. Accordingly, the side support is restrained from bending toward the rearward side in the vehicle-body front-rear direction. Thus, damage to the at least one electrical component disposed rearward of the side support in the vehicle-body front-rear direction in a collision is suppressed or avoided. As a result, the degree of freedom in disposing the at least one electrical component rearward of the radiator in the vehicle-body front-rear direction is improved.

In the vehicle according to the above aspect, the reinforcing member may include one or more rectangular wave portions in a cross-section orthogonal to an extending direction of the reinforcing member.

In the vehicle according to the above aspect, the reinforcing member may include two rectangular wave portions, and a trough portion between the two rectangular wave portions, in a cross-section orthogonal to an extending direction of the reinforcing member.

In the vehicle according to the above aspect, the reinforcing member may be a brace member extending between the side support and the side member.

In the vehicle according to the above aspect, the reinforcing member may be fixed to the side support and the side member by a fastening member.

In the vehicle according to the above aspect, the at least one electrical component may include at least one of a vehicle driving motor, a control device for vehicle driving electric power, an auxiliary battery, and a relay box.

In the vehicle according to the above aspect, the at least one electrical component may include the relay box and the auxiliary battery, and the relay box may be located rearward of the side support in the vehicle-body front-rear direction, and be disposed at a frontmost position among the at least one electrical component in the vehicle body.

The vehicle according to the above aspect may include a pair of the reinforcing members, and the vehicle may further include a cross member linking the pair of the side members in the vehicle-body width direction, the cross member being located rearward of the radiator in the vehicle-body front-rear direction.

The vehicle according to the above aspect may include a pair of the reinforcing members, and each of the reinforcing member may be fixed on a gusset disposed at a portion at which the side member and the cross member intersect.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
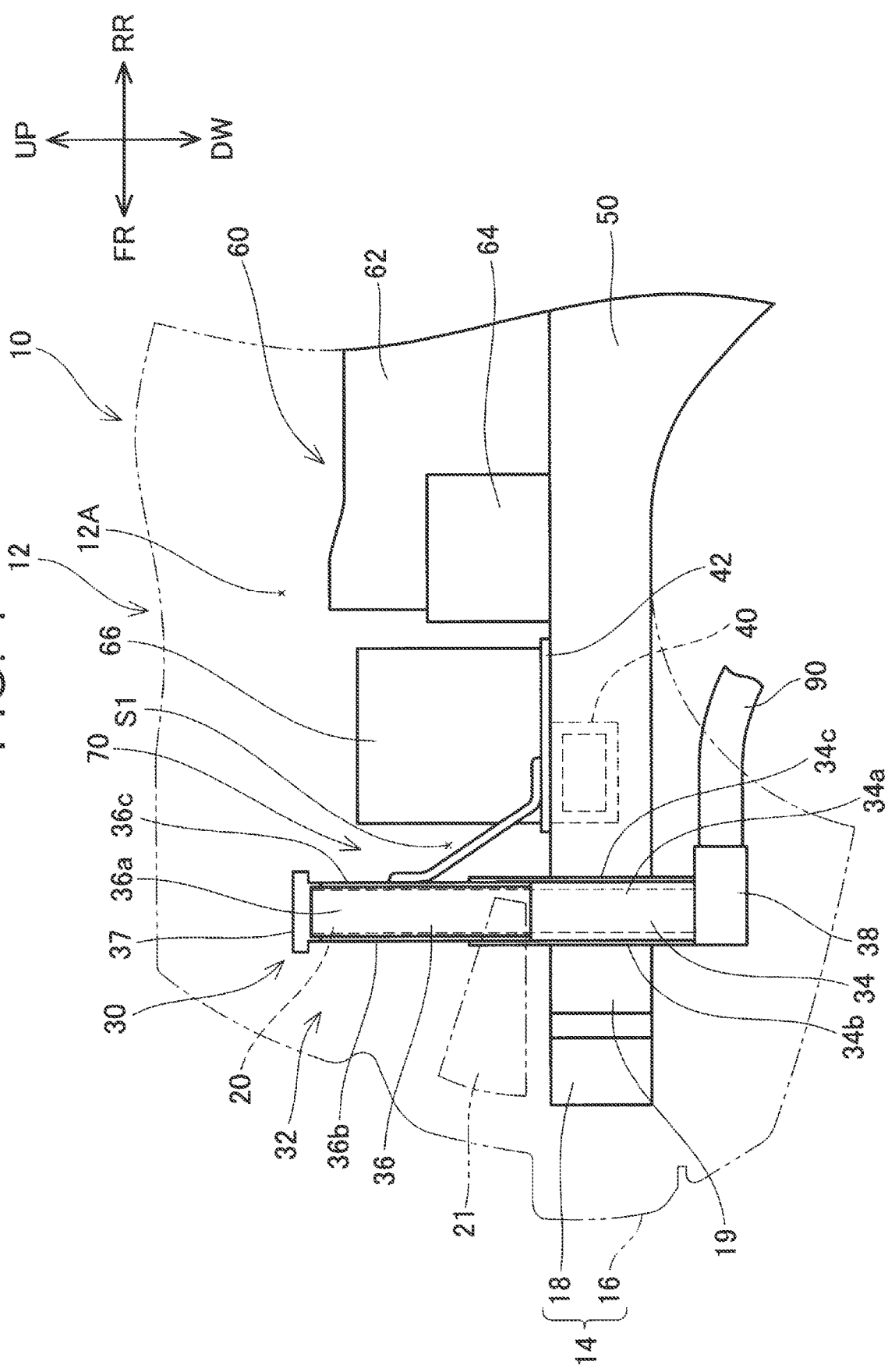
FIG. 1 is a side view of a frontal portion of a vehicle body.

In an embodiment of the present technology, a reinforcing member may have one or more rectangular wave portions in a cross section orthogonal to the extending direction of the reinforcing member. Further, the reinforcing member may have two rectangular wave portions, and a trough portion between the two rectangular wave portions, in a cross-section orthogonal to the extending direction of the reinforcing member. Thus, rearward bending of a side support can be further suppressed.

In an embodiment of the present technology, the reinforcing member may be a brace member extending between the side support and a side member. Thus, rearward bending of the side support can be effectively suppressed while conserving space.

In an embodiment of the present technology, the reinforcing member may be fixed to the side support and the side member by a fastening member. Thus, replacement is easy.

In an embodiment of the present technology, at least one electrical component may include at least one of a vehicle driving motor, a control device for vehicle driving electric power, an auxiliary battery, and a relay box. The at least one electrical component may be provided in an engine vehicle as well as an electrified vehicle.

In an embodiment of the present technology, the at least one electrical component may include the relay box and the auxiliary battery, the relay box being located rearward of the side support in the vehicle-body front-rear direction, and being disposed at a frontmost position among the at least one electrical component in the vehicle body. This is because repair costs of the relay box are high, but there is high demand for the relay box to be disposed rearward of the side support in the vehicle-body front-rear direction at the forward side of the vehicle body.

In an embodiment of the present technology, a cross member may be provided linking a pair of the side members in a vehicle-body width direction, the cross member being located rearward of the radiator in the vehicle-body front-rear direction. Thus, the at least one electrical component is further protected.

Note that the side supports are usually provided as a pair on the right and left in the vehicle-body width direction. By providing the reinforcing member disclosed in the present specification on at least one side support, rearward bending to the electrical component side rearward of this one side support is suppressed or avoided.

A frontal portion structure of a vehicle body 12 of a vehicle 10 will be described below, as an embodiment of the present technology. The vehicle 10 described in the following drawings is an electrified vehicle, and is provided with an electrical unit, such as a motor for driving the vehicle, disposed forward in the vehicle body 12. Note that the vehicle 10 may be any of a variety of electrified vehicles, or may be an engine vehicle. A direction FR in the drawings indicates forward in a front-rear direction of the vehicle body 12, and a direction RR indicates rearward in the front-rear direction of the vehicle body 12. A direction UP indicates upward in an up-down direction of the vehicle body 12, and a direction DW indicates downward in the up-down direction of the vehicle body 12. Note that in the present specification, the front-rear direction of the vehicle body 12, a width direction of the vehicle body 12, and the up-down direction of the vehicle body 12, may be referred to simply as the front-rear direction, the width direction, and the up-down direction, respectively.

Figure 2:
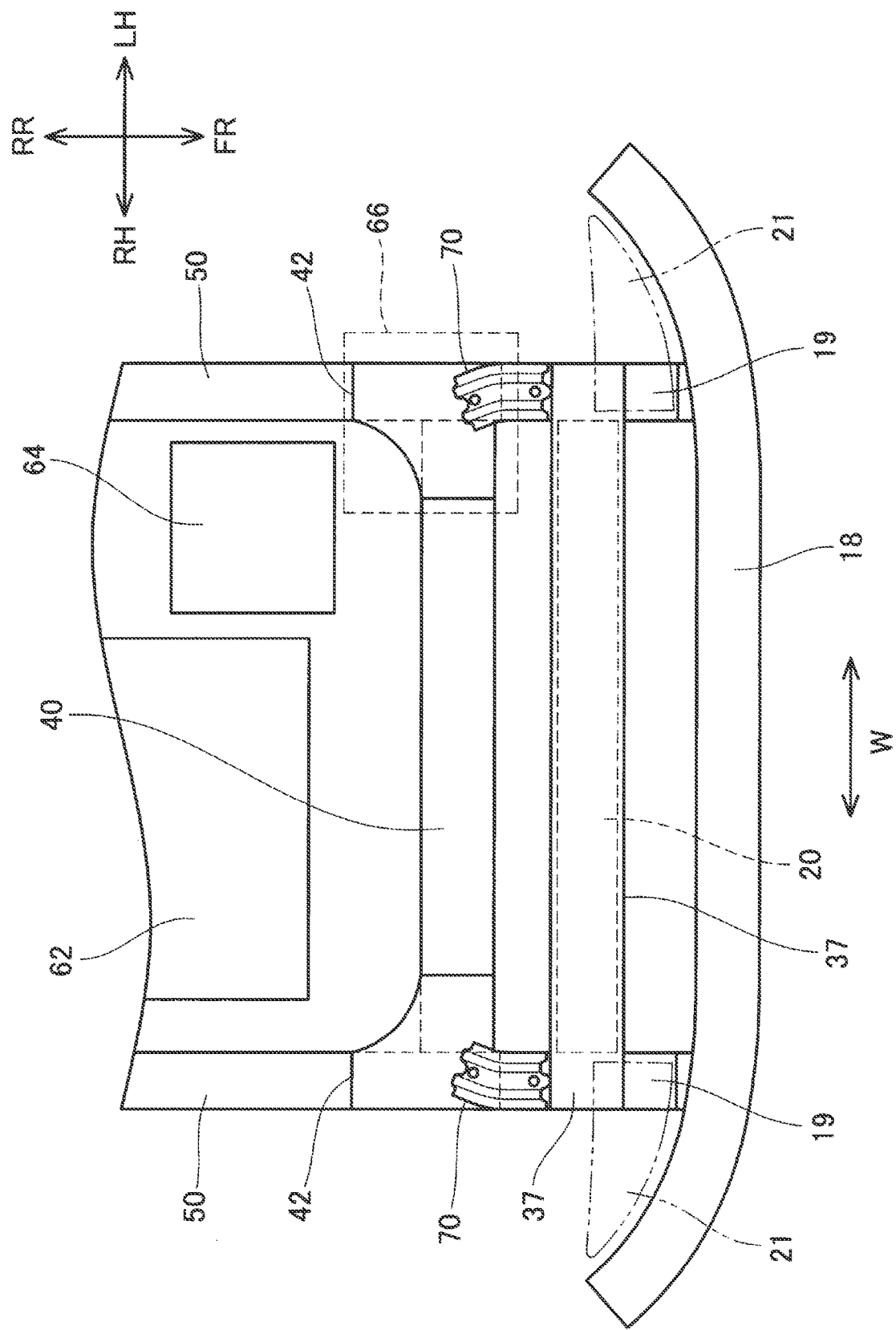
FIG. 2 is a plan view of the frontal portion of the vehicle body.

FIG. 1 illustrates a state in which a vehicle body structure at the forward side of the vehicle body 12 is viewed from the left side, and FIG. 2 illustrates a plan view of the frontal portion of the vehicle body 12. FIGS. 1 and 2 exemplarily illustrate a radiator 20 disposed at the forward side of the vehicle body 12, a radiator support 30 for supporting the radiator 20, a pair of right and left front side members 50 extending along the front-rear direction of the vehicle body 12, an electrical component group 60, reinforcing members 70, and members in the vicinity thereof.

As illustrated in FIGS. 1 and 2, a motor compartment 12A (hereinafter referred to simply as "compartment 12A") serving as a vehicle frontal portion space in which electrical components such as a motor installed as a prime mover are housed, is formed at the frontal portion of the vehicle body 12, rearward of the radiator 20.

Examples of the electrical components housed in the compartment 12A include the motor for driving the vehicle (hereinafter, simply referred to as "motor"), a power control unit, a compressor for an air conditioner, the auxiliary battery, the relay box, and so forth. A motor 62 and an auxiliary battery 64 are disposed in FIGS. 1 and 2. Further, a relay box 66 for switching operations of various kinds of electrical equipment installed in the vehicle 10 is disposed over a portion at which the front side members 50 and a later-described cross member 40 intersect. The relay box 66 is the frontmost electrical component, and is disposed rearward from a headlamp 21.

Description will be made below starting from the forward side of the vehicle body 12. As illustrated in FIGS. 1 and 2, a front bumper 14 is provided at the frontal portion of the vehicle body 12. The front bumper 14 includes a bumper cover 16 and a bumper reinforcement (hereinafter, also simply referred to as "bumper RF") 18 covered by the bumper cover 16. The bumper RF 18 extends along the width direction of the vehicle body, and has a curved shape that bulges forward from the vehicle body. The bumper RF 18 is a structural member of the front bumper 14, and a cross-section thereof orthogonal to the vehicle-body width direction is a closed cross-section.

A pair of right and left crash boxes 19 is provided on the end portion sides of the bumper RF 18 in the width direction. When being subjected to an axial-direction load, the crash boxes 19 exhibit compressive plastic deformation and absorb the energy. A pair of right and left headlamps 21 is provided upward and toward the outside of the crash boxes 19 in the up-down direction of the vehicle body, by stays as appropriate.

The right and left front side members 50 are provided rearward of the right and left crash boxes 19 via a pair of right and left radiator support sides 32, which are part of the radiator support 30. The front side members 50 extend on both sides of the compartment 12A along the front-rear direction of the vehicle body. The front side members 50 are an example of a side member disclosed in the present specification.

The front side members 50 are vehicle body structural members, each formed having a closed cross-sectional structure, for example. The front side members 50 are fixed so as to be coaxial to the crash boxes 19, so that the collision load from the forward side of the vehicle body 12 is reduced. Thus, the electrical components in the compartment 12A are protected.

As illustrated in FIGS. 1 and 2, the radiator support sides 32 extend in the up-down direction of the vehicle body over a predetermined length, to support both side walls of the radiator 20 in the width direction. The radiator support sides 32 are each configured to include a lower member 34 and an upper member 36. The lower member 34 has a predetermined length in the up-down direction, and is formed as a so-called channel member having a portion formed in a groove shape that opens to the outward side in the width direction. The lower member 34 has an inner wall portion 34a extending in the up-down direction along the downward side of the side wall of the radiator 20, and a front wall portion 34b and a rear wall portion 34c projecting outward orthogonally from a front end edge and a rear end edge of the inner wall portion 34a, respectively. The front end portions of the front side members 50 are fixed to the rear wall portions 34c at the rearward sides thereof in the vehicle-body front-rear direction, and the crash boxes 19 are fixed to the front wall portions 34b at the forward sides thereof. The radiator support sides 32 are an example of the side support disclosed in the present specification.

The side wall of the radiator 20 is fixed to the inner side in the width direction of the inner wall portion 34a of the lower member 34. The upper member 36 is fixed to a portion of the lower member 34 surrounded by the groove shape, overlapping therewith over a predetermined range in the up-down direction of the vehicle body. The front side members 50, the crash boxes 19, and the upper members 36 are linked to the lower members 34, and accordingly the lower members 34 also function as mounting gussets for the vehicle structural members in the frontal portion of the vehicle body 12.

The upper member 36 has a predetermined length in the up-down direction, and is formed as a channel member having a portion formed in a groove shape that opens to the outward side in the width direction. The upper member 36 has an inner wall portion 36a extending in the up-down direction along the upward side of the side wall of the radiator 20, and a front wall portion 36b and a rear wall portion 36c projecting outward orthogonally from a front end edge and a rear end edge of the inner wall portion 36a, respectively. The side wall of the radiator 20 is fixed to the inner side in the width direction of the inner wall portion 36a of the upper member 36.

The radiator support 30 including the radiator support sides 32 makes up a frame having a substantially square cross-section, enabling the radiator 20 to be supported within the frame. Here, the radiator 20 has a substantially rectangular shape in the front view along the up-down direction and the width direction of the vehicle body 12, and is, for example, a flat structure in the front-rear direction.

The radiator support 30 includes the above-described radiator support sides 32, an upper radiator support 37, and a lower radiator support 38. The upper radiator support 37 supports an upper side portion of the radiator 20. Both end portions of the upper radiator support 37 are linked to the members located rearward of the upper radiator support 37 in the vehicle body 12 via the upper end portions of the upper members 36 of the radiator support sides 32.

The lower radiator support 38 supports a lower side portion of the radiator 20. The lower radiator support 38 extends in the width direction along the lower side portion, and is fixed to the lower end portions of the lower members 34 of the radiator support sides 32. As illustrated in FIG. 1, the lower radiator support 38 is configured as a front cross member provided below the front side members 50, for example. The front cross member is provided below the front side members 50 and supported by a subframe 90 extending in the front-rear direction. The subframe 90 may make up part of a suspension support.

As illustrated in FIGS. 1 and 2, the compartment cross member (hereinafter, simply referred to as "cross member") 40 is fixed in the compartment 12A rearward of the radiator 20 and the radiator support 30. The cross member 40 is disposed rearward of the radiator 20 by a predetermined distance therefrom, has a closed cross-section orthogonal to the vehicle-body width direction, extends between the right and left front side members 50 along the width direction, thereby bridging the front side members 50.

In a space S1 defined by the rearward side of the radiator support sides 32 in the vehicle-body front-rear direction and the forward side of the front side members 50 in the vehicle-body front-rear direction, the reinforcing members 70 are provided. Each of the reinforcing members 70 is fixed to the radiator support side 32 and the front side member 50, and extends therebetween.

Figure 3:
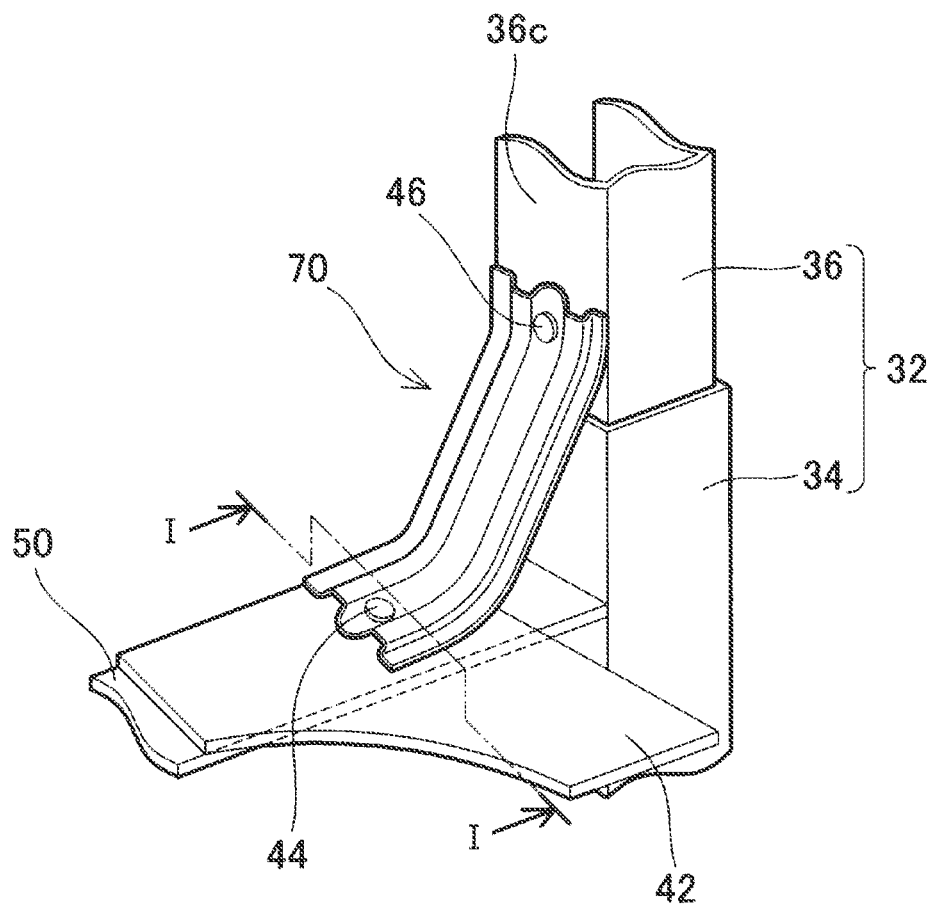
FIG. 3 is an enlarged view of a reinforcing member.

As illustrated in FIG. 1, in this space S1, the reinforcing members 70 diagonally extend spanning between the front side members 50 and the radiator support sides 32, as brace members. As enlarged and shown in FIG. 3, reinforcing members 70 are formed as plate members each of which has a predetermined width in the vehicle-body width direction and each of which is elongated in the direction in which it extends. The reinforcing member may be fixed upon a gusset disposed at the portion at which the side support and the cross member intersect. For example, the front side member 50 side of the reinforcing member 70 is fixed on a high-strength gusset 42 that reinforces the intersecting portion between the front side member 50 and the cross member 40 by a fastening member such as a bolt 44 or the like. The radiator support side of the reinforcing member 70 is fixed to the rearward side of the rear wall portion 36c of the upper member 36 in the vehicle-body front-rear direction, by a fastening member such a bolt 46 or the like.

Figure 4:
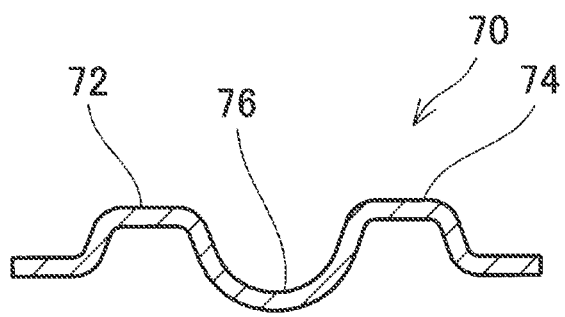
FIG. 4 is a diagram illustrating a cross-sectional view taken along line I-I of the reinforcing member illustrated in FIG. 3.

As illustrated in FIG. 4, a cross-sectional profile of the reinforcing member 70 in a direction orthogonal to the direction in which the reinforcing member 70 extends has one rectangular wave portion 72 and one rectangular wave portion 74, on respective sides in the width direction, and a trough portion 76 between the rectangular wave portions 72 and 74 that is recessed further than both end portions. This enables the rearward side of the radiator support side 32 to be supported more effectively, thereby suppressing the rearward bending of the radiator support side 32 and suppressing the length of backward stroke.

Next, the effects and advantages of the vehicle 10 having such a vehicle body frontal portion structure will be described. In the above embodiment, the reinforcing members 70 are brace-like members in the spaces S1 defined by the rearward sides of the radiator support sides 32 and the upward sides of the front side members 50. Accordingly, when collision energy from ahead is input to end portions of the vehicle body 12 in the width-direction, rearward bending of the radiator support sides 32 is suppressed even when the headlamps 21 press the radiator support sides 32 rearward in the vehicle body. In particular, bending at a position below the range bridged by the reinforcing member 70 is suppressed. Accordingly, the amount of rearward bending of the radiator support sides 32 (particularly, the upper members 36) is reduced, and the amount of rearward displacement is reduced as a whole.

As a result, even when the electrical components 62, 64, and 66 are arranged rearward of the headlamps 21 in the compartment 12A, transmission of the collision load to the electrical components 62, 64, and 66 can be suppressed or avoided, and damage to the electrical components 62, 64, and 66 can be suppressed or avoided. Thus, repair costs of the electrical components 62, 64, and 66 due to the collision are also reduced. Also, as a result, electrical components such as the relay box 66, which would be heavily damaged by input of collision load, can be disposed at the forward part of the vehicle body, particularly rearward from the headlamps 21 and rearward from the radiator support sides 32.

That is to say, the degree of freedom in laying out electrical components such as the relay box 66 in the compartment 12A is improved.

In addition to frontal collisions, the present technology is similarly effective for other kinds of collisions, such as small overlap collisions (when a collision object such as a barrier or the like collides with the frontal portion of a vehicle with a small amount of overlap with the vehicle in the width direction) or minor collisions. The present technology is meaningful with respect to small overlap collisions and minor collisions, since the effects on the frontal portion of the vehicle body are relatively large in such types of collisions.

In the above embodiment, the reinforcing member 70 is fastened and fixed by bolts 44 and 46 or the like, and accordingly replacing the reinforcing members 70 when repairing is easy. Further, in the above embodiment, the reinforcing members 70 are attached to the gussets 42 for fixing and reinforcing the cross member 40 on the front side members 50, and accordingly damage to the front side members 50 due to input of the collision load to the reinforcing member 70 is suppressed or avoided.

In the above embodiment, the reinforcing member 70 is formed as a substantially plate member and serves as a brace member, and accordingly rearward bending of the radiator support sides 32 can be effectively suppressed or avoided, while conserving space. Also, forming the reinforcing members 70 as substantially plate members with the cross-sectional profile in a direction orthogonal to the extending direction having the rectangular wave portions 72 and 74, and the trough portion 76, enables rearward bending of the radiator support sides 32 to be suppressed or avoided even more effectively.

In the above embodiment, by providing the cross member 40 rearward of the radiator 20 and the radiator support 30, even when a collision load is input to the radiator support 30 and so forth from ahead of the vehicle body 12, input of the collision load to the electrical components in the compartment 12A would be suppressed or avoided. Accordingly, the electrical components can be protected even further.

In the above embodiment, the reinforcing members 70 are plate brace members, but this is not limiting, and any arrangement that extends linking the radiator support sides 32 and the front side members 50 in the spaces S1 defined by the rearward side of the radiator support sides 32 and the upward side of the front side members 50 may be used. Accordingly, the reinforcing members 70 may be brace members made of other elongated members such as rods or the like, for example. Also, the reinforcing member 70 may be a frame member having a substantially right-angled triangle form, which is provided with, for example, such a diagonal brace member as a hypotenuse member, and also is provided with an upright side member extending over a predetermined range in the up-down direction of the radiator support side 32 and a base member extending over a predetermined range of the front side member 50 in the front-rear direction. Also, for example, the reinforcing member 70 may be a plate member having a substantially right-angled triangle form, which is provided with a hypotenuse portion extending between the radiator support side 32 and the front side member 50, an upright side portion extending over a predetermined range in the up-down direction of the radiator support side 32, and a base portion extending over a predetermined range of the front side member 50 in the front-rear direction, or a trapezoid-shaped plate member in which the right angle portion thereof is cut away. Also, when the reinforcing member 70 has a plate-shaped body, the plate-shaped body may be provided with rectangular wave portions and trough portions as appropriate.

In the above embodiment, the radiator support sides 32 are configured of the lower members 34 and the upper members 36, but are not limited thereto. The side support disclosed in the present specification may be configured of a single member. Also, the side support may separately include a member for linking the front side member 50 and so forth. Further, the cross-sectional shape and so forth of the side support is not limited to a groove shape, and can be set as appropriate.

In the above embodiment, the reinforcing members 70 are provided between the radiator support sides 32 and the front side members 50, but this is not limiting. The reinforcing members 70 may be provided between the radiator support sides 32 and the subframe 90 that is part of the suspension support downward from the front side member 50.

Although specific examples of the technology disclosed in the present specification are described in detail above, these are only exemplifications, and are not intended to limit the scope of the claims. The technology described in the claims includes various modifications and alternations of the specific examples exemplified above. The technical elements described in the present specification or the drawings exhibit technical utility alone or in various combinations, and are not limited to the combinations described in the claims as originally filed. The technology exemplified in the present specification or the drawings can achieve a plurality of objects at the same time, and has technical utility in itself by achieving one of the objects.

What is claimed is:

1. A vehicle comprising:
   a vehicle body;
   a radiator located on a forward side in the vehicle body;
   a side support that supports a side portion of the radiator in a vehicle-body width direction and that extends along a vehicle-body up-down direction;
   a side member that is linked to the side support and that extends along a vehicle-body front-rear direction;
   at least one electrical component disposed rearward of the radiator in the vehicle-body front-rear direction; and
   a reinforcing member that is joined to and extends between the side support and the side member in a space defined by a rearward side of the side support in the vehicle-body front-rear direction and an upward side of the side member in the vehicle-body up-down direction.

2. The vehicle according to claim 1, wherein the reinforcing member includes one or more rectangular wave portions in a cross-section orthogonal to an extending direction of the reinforcing member.

3. The vehicle according to claim 1, wherein the reinforcing member includes two rectangular wave portions, and a trough portion between the two rectangular wave portions, in a cross-section orthogonal to an extending direction of the reinforcing member.

4. The vehicle according to claim 1, wherein the reinforcing member is a brace member extending between the side support and the side member.

5. The vehicle according to claim 1, wherein the reinforcing member is fixed to the side support and the side member by a fastening member.

6. The vehicle according to claim 1, wherein the at least one electrical component includes at least one of a vehicle driving motor, a control device for vehicle driving electric power, an auxiliary battery, and a relay box.

7. The vehicle according to claim 6, wherein:
the at least one electrical component includes the relay box and the auxiliary battery; and
the relay box is located rearward of the side support in the vehicle-body front-rear direction, and is disposed at a frontmost position among the at least one electrical component in the vehicle body.

8. The vehicle according to claim 1, wherein:
the vehicle includes a pair of the side members; and
the vehicle further includes a cross member linking the pair of the side members in the vehicle-body width direction, the cross member being located rearward of the radiator in the vehicle-body front-rear direction.

9. The vehicle according to claim 8, wherein:
the vehicle includes a pair of the reinforcing members; and
each of the reinforcing members is fixed on a gusset disposed at a portion at which a corresponding one of the side members and the cross member intersect.

* * * * *